United States Patent [19]
Chen et al.

[11] Patent Number: 5,473,552
[45] Date of Patent: Dec. 5, 1995

[54] SCHEME FOR ISOLATING A COMPUTER SYSTEM FROM A DATA TRANSMISSION NETWORK

[75] Inventors: Chengwu Chen, Rancho Cordova; Michael A. Gley, Sacramento, both of Calif.

[73] Assignee: Intel Corporation, Santa Clara, Calif.

[21] Appl. No.: 260,113

[22] Filed: Jun. 15, 1994

[51] Int. Cl.$^6$ ........................................ H04B 1/38
[52] U.S. Cl. .................. 364/514 R; 375/222; 379/412
[58] Field of Search .................. 375/222; 370/85.1, 370/94.1, 56; 361/56, 11; 379/95, 98, 399, 412, 410, 107; 378/110; 364/514

[56] References Cited

U.S. PATENT DOCUMENTS

| | | | |
|---|---|---|---|
| 4,896,349 | 1/1990 | Kubo et al. | 379/107 |
| 5,086,454 | 2/1992 | Hirzel | 379/98 |
| 5,134,648 | 7/1992 | Hochfield et al. | |
| 5,369,666 | 11/1994 | Folwell et al. | 375/8 |

FOREIGN PATENT DOCUMENTS

0309627A1  4/1989  European Pat. Off. .

OTHER PUBLICATIONS

"89024, 2400 BPS Intelligent Modem Chip Set," *Connectivity*, Intel Corporation, pp. 4–1 through 4–22 (1993).

*Primary Examiner*—James P. Trammell
*Attorney, Agent, or Firm*—Blakely, Sokoloff, Taylor & Zafman

[57] ABSTRACT

A data transmission system for a host computer includes a converter coupled to the host computer and an external data transmission network for converting signals from one form into another, and an isolation circuit for electrically isolating the host computer from the data transmission network. The isolation circuit is placed between the host computer and the converter such that the host computer is electrically isolated from the data transmission network when data transmission is conducted between the host computer and the data transmission network. The isolation circuit digitally isolates the host computer from the external data transmission network such that noise and signal distortion generated by the isolation circuit do not affect the data transmission between the host computer and the data transmission network. The isolation circuit digitally isolates the host computer from the data transmission network such that the isolation circuit can be implemented by opto-couplers and/or transformers and the signal distortion and noise produced by the opto-couplers, transformers, and/or other known means that do not affect the data transmission between the host computer and the external data transmission network.

5 Claims, 10 Drawing Sheets

5,473,552

SCHEME FOR ISOLATING A COMPUTER SYSTEM FROM A DATA TRANSMISSION NETWORK

FIELD OF THE INVENTION

The present invention pertains to the field of computer systems. More particularly, this invention relates to an improved scheme for electrically isolating a computer system from an external data transmission network such that data transmission between the computer system and the network is optimized and the isolation is achieved in a cost effective manner.

BACKGROUND OF THE INVENTION

When a computer system is connected to a remote computer system via a public telephone network, a modem is typically used to connect the computer system to the telephone network. The function of the modem is to convert a digital signal into an analog signal that is suitable for transmission over the telephone network, and to convert an analog signal back into a digital signal.

FIG. 1 illustrates a prior art arrangement of connecting a host computer system 10 to a public telephone network 16 via a modem 11. As can be seen in FIG. 1, modem 11 typically includes a peripheral controller 17, a digital signal processor ("DSP") 12, a digital-to-analog ("D/A") and analog-to-digital ("A/D") converter 13, an isolation circuit 14, and a line interface circuit 15. DSP 12 is connected to computer system 10 via peripheral controller 17. D/A and A/D converter 13 is connected to DSP 12 and isolation circuit 14. Line interface circuit 15 is connected to isolation circuit 14 and external telephone network 16.

Line interface circuit 15 is used to interface with telephone network 16. Line interface circuit 15 typically includes the hardware for matching the line characteristics of telephone network 16. D/A and A/D converter 13 is used to convert digital signals into analog signals, and vice versa. DSP 12 is used to perform all digital signal processing functions of modem 11. DSP 12 typically performs the modulation and demodulation function of modem 11. Peripheral controller 17 is used to interface with host computer system 10 for transferring data to and from computer system 10.

Isolation circuit 14 is used to electrically isolate computer system 10 from telephone network 16. This is to satisfy the requirement of telephone network 16. Typically, a public telephone network is required to be electrically isolated from the user system. This is to prevent power surges occurred in either the user system or the public telephone network from affecting the other.

Disadvantages are, however, associated with this prior art arrangement. One disadvantage is that the isolation circuit used in the modem introduces noise and signal distortion to the signals transmitted to and received from the telephone network, thus reducing quality, accuracy, and data throughput of the data transmission between the host computer system and the telephone network. This is due to the fact that the isolation circuit is placed at the analog side of the modem. Another disadvantage is that the isolation circuit typically causes signal loss and reduces efficiency and accuracy in data transmission and reception.

As can be seen from FIG. 1, isolation circuit 14 is placed between converter 13 and line interface circuit 15 along the analog side of modem 11. Signals are transmitted along the analog side of modem 11 in analog form. Typically, isolation circuit 14 employs transformers or linear opto-couples in order to isolate computer system 10 from telephone network 16. As is known, the transformers and opto-couplers typically generate noise and signal distortion to the signals transmitted through isolation circuit 14. The noise and signal distortion greatly affects the signals transmitted when the signals transmitted are in analog form.

SUMMARY AND OBJECTS OF THE INVENTION

One of the objects of the present invention is to effectively isolate a computer system from an external data transmission network.

Another object of the present invention is to electrically isolate a computer system from an external data transmission network while minimizing noise and signal distortion to the data transmission.

A further object of the present invention is to provide an improved arrangement for isolating a digital computer system from an external data transition network cost effectively, wherein noise and signal distortion of data transmission between the computer system and the network is substantially minimized.

A data transmission system for a host computer includes a converter coupled to the host computer and to an external data transmission network for converting signals from one form into another, and an isolation circuit for electrically isolating the host computer from the data transmission network. The isolation circuit is placed between the host computer and the converter such that the host computer is electrically isolated from the data transmission network when data transmission is conducted between the host computer and the data transmission network. The isolation circuit digitally isolates the host computer from the external data transmission network such that noise and signal distortion generated by the isolation circuit do not affect the data transmission between the host computer and the data transmission network. The isolation circuit digitally isolates the host computer from the data transmission network such that the isolation circuit can be implemented by opto-couplers and/or transformers and the signal distortion and noise produced by the opto-couplers and/or transformers do not affect the data transmission between the host computer and the external data transmission network.

Other objects, features, and advantages of the present invention will be apparent from the accompanying drawings and from the detailed description that follows.

BRIEF DESCRIPTION OF THE DRAWINGS

The present invention is illustrated by way of example and not limitation to the figures of the accompanying drawings, in which like references indicate similar elements and in which.

DETAILED DESCRIPTION

Figure 1:
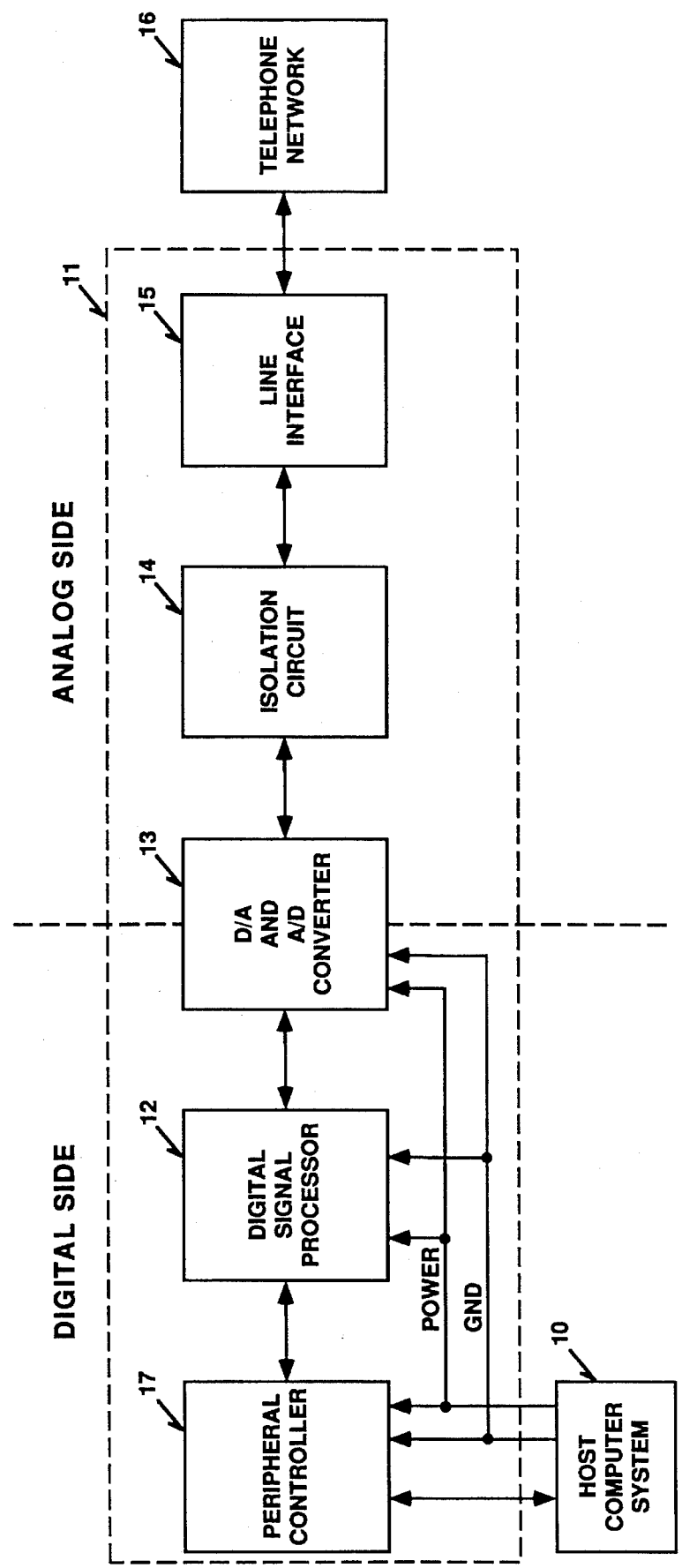
FIG. 1 is a block diagram of a prior art arrangement for isolating a computer system from a data transmission network.
Figure 2:
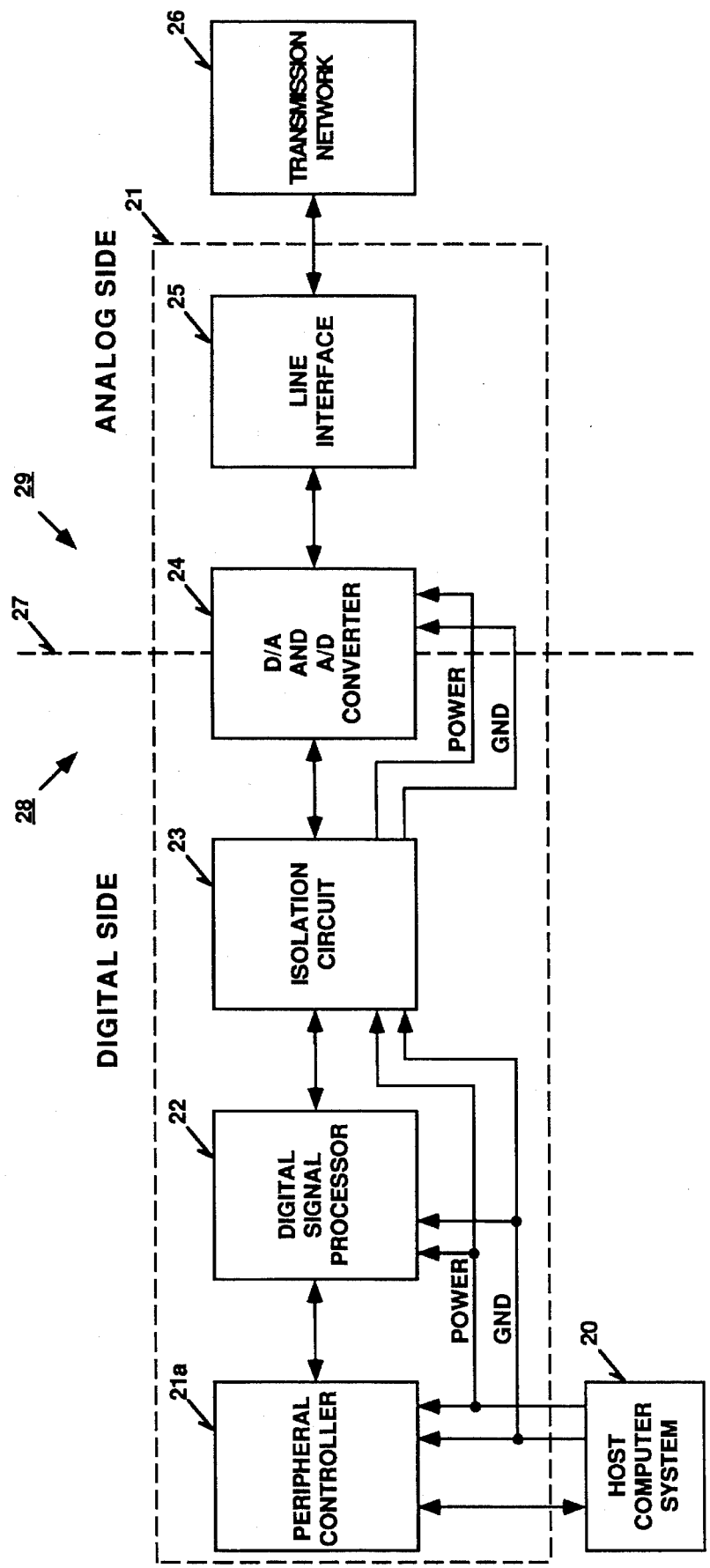
FIG. 2 is a block diagram of an arrangement for isolating a computer system from a data transmission network in accordance with one embodiment of the present invention.

FIG. 2 illustrates in block diagram form a modem 21 within which an arrangement for electrically isolating a host computer system 20 from a transmission network 26 in accordance with one embodiment of the present invention is implemented. As can be seen from FIG. 2, modem 21 is connected to host computer system 20 and transmission network 26. Modem 21 includes an isolation circuit 23 for electrically and digitally isolating computer system 20 from transmission network 26, which will be described in more detail below.

Computer system 20 can be any kind of computer system or data processing system. For one embodiment, computer system 20 is a personal computer system. For alternative embodiments, computer system 20 can be any other computer system such as a notebook, a workstation, a mainframe, or a minicomputer. In addition, computer system 20 can be a terminal connected to a computer system or an electronic device that can be interfaced with a modem.

Transmission network 26 is a public telephone network. Alternatively, transmission network 26 can be any other type of data transmission network. For example, transmission network 26 can be a local area network ("LAN"), a wide area network ("WAN"), an integrated service digital network ("ISDN"), or a fiber distributed data interface ("FDDI") network.

When transmission network 26 is not a public telephone network, modem 21 can still be used if the network transmits analog signals. In addition, modem 21 can be replaced with a controller that is associated with the network. For example, if transmission network 26 is a LAN, then modem 21 is replaced with a LAN controller.

Modem 21 includes a digital side 28 and an analog side 29. Digital and analog sides 28 and 29 are divided by line 27. Signals are transmitted along digital side 28 in digital form and signals are transmitted along analog side 29 in analog form.

Modem 21 includes a peripheral controller 21a, a digital signal processor ("DSP") 22, a D/A and A/D converter 24, and a line interface circuit 25. DSP 22 is connected to computer system 20 via peripheral controller 21a. DSP 22 is also connected to isolation circuit 23. Isolation circuit 23 is then connected to converter 24. Converter 24 is then connected to line interface circuit 25 which is connected to transmission network 26. Peripheral controller 21a, DSP 22, and isolation circuit 23 are located along digital side 28 of modem 21 and signals transmitted among peripheral controller 21a, DSP 22, and converter 24 via isolation circuit 23 are in digital form. Line interface circuit 25 is located along analog side 29 of modem 21 and signals transmitted between converter 24 and line interface circuit 25 are in analog form. Converter 24 separates digital side 28 from analog side 29 and acts as an interface between the two sides.

Peripheral controller 21a is used to interface with host computer system 20. Peripheral controller 21a controls data transmission of modem 21 to and from computer system 20. Peripheral controller 21a also performs data compression and decompression, data error detection and correction, and data encoding and decoding functions.

DSP 22 performs all digital signal processing functions of modem 21. These processing functions include modulating data received from computer system 20 into digitized signal, and demodulating the digitized signal received from transmission network 26 via converter 24 to obtain the data. DSP 22 can be any kind of known digital signal processor for a modem.

D/A and A/D converter 24 receives the digitized signal from digital signal processor 22 via isolation circuit 23 and converts the digitized signal into analog signal suitable for transmission over transmission network 26. The converted analog signal is then applied to transmission network 26 via line interface circuit 25. When converter 24 receives data in modulated analog signal form from transmission network 26, converter 24 converts the analog signal into digitized signal. The digitized signal is then sent to DSP 22 via isolation circuit 23. DSP 22 then demodulates the digitized signal to obtain the data. The demodulated data is then transferred to computer system 20 from DSP 22 via peripheral controller 21a. D/A and A/D converter 24 can be any kind of known D/A and A/D converter for a modem.

Line interface circuit 25 is used in modem 21 to interface with transmission network 26. Line interface circuit 25 includes the hardware for matching the line characteristics of transmission network 26. Line interface circuit 25 can be implemented by any known circuit.

The operation of modem 21 is now briefly described. When computer system 20 is transmitting data to transmission network 26, DSP 22 modulates the digital data received from computer system 20 into digitized amplitude, frequency, and/or phase samples. The digitized sample is then applied to converter 24 via isolation circuit 23. Converter 24 then converts the digitized sample into an analog signal suitable for transmission in transmission network 26. Converter 24 then sends the converted analog signal to transmission network 26 via line interface circuit 25.

When computer system 20 is receiving data from transmission network 26, converter 24 receives the data from transmission network 26 via line interface circuit 25 in modulated analog signal form. Converter 24 converts the modulated analog signal into digitized signal. The digitized signal is then applied to DSP 22 from converter 24 via isolation circuit 23. DSP 22 then demodulates the digitized signal to obtain the data. The demodulated data is then applied to computer system 20 from DSP 22 via peripheral controller 21a.

Isolation circuit 23 is used in modem 21 to electrically isolate computer system 20 from transmission network 26. Isolation circuit 23 can be implemented by readily available off-the-shelf transformers or opto-couplers. Alternatively, isolation circuit 23 can be implemented by other known isolation circuits or means.

As can be seen from FIG. 2, isolation circuit 23 is located along digital side 28 of modem 21. Isolation circuit 23 is located between DSP 22 and converter 24 along digital side 28 of modem 21.

Isolation circuit 23 produces noise and signal distortion to the signals transmitted between DSP 22 and converter 24. However, because the signals transmitted between DSP 22 and converter 24 are in digital form, the noise and signal distortion generated by isolation circuit 23 do not affect the signals transmitted between DSP 22 and converter 24. By implementing the isolation along digital side 28 instead of analog side 29 of modem 21, the sources of noise and signal distortion in isolation circuit 23 that affect the signal transmission between computer system 20 and transmission network 26 are eliminated. As is known, signals transmitted in digital form have much higher noise immunity and can sustain much higher signal distortion than signals transmitted in analog form.

In other words, although isolation circuit 23 generates noise and signal distortion to the signals transmitted through it, the noise and signal distortion produced do not cause the signals transmitted through isolation circuit 23 to lose their original values. This is due to the fact that the signals transmitted are in digital form. Therefore, by placing isolation circuit 23 along digital side 28 (i.e., digital isolation), the noise and signal distortion generated by isolation circuit 23 do not affect the signal transmission through isolation circuit 23.

In addition, because isolation circuit 23 is allowed to produce noise and signal distortion, the standards for selecting isolation circuit 23 in modem 21 can also be lowered accordingly. This allows for the implementation of isolation circuit 23 with inexpensive off-the-shelf transformers and/or opto-couplers. In addition, because the noise and signal distortion generated by isolation circuit 23 are no longer of concern to the signal transmission of modem 21, the data transfer rate of modem 21 can therefore be maximized. This also increases the data throughput between computer system 20 and transmission network 26.

As can be seen from FIG. 2, converter 24 is powered by host computer system 20 via isolation circuit 23. Isolation circuit 23 also isolates the power supply and ground GND from host computer system 20 before they are applied to converter 24. This ensures that converter 24 is properly powered while completely isolated from host computer system 20.

Because converter 24 is also electrically isolated from host computer system 20, as can be seen from FIG. 2, converter 24 can therefore receive the power supply from transmission network 26. This can be done using the known power extraction technique for a telephone set. Converter 24 can also receive the power supply from an external power supply system.

Figure 3A:
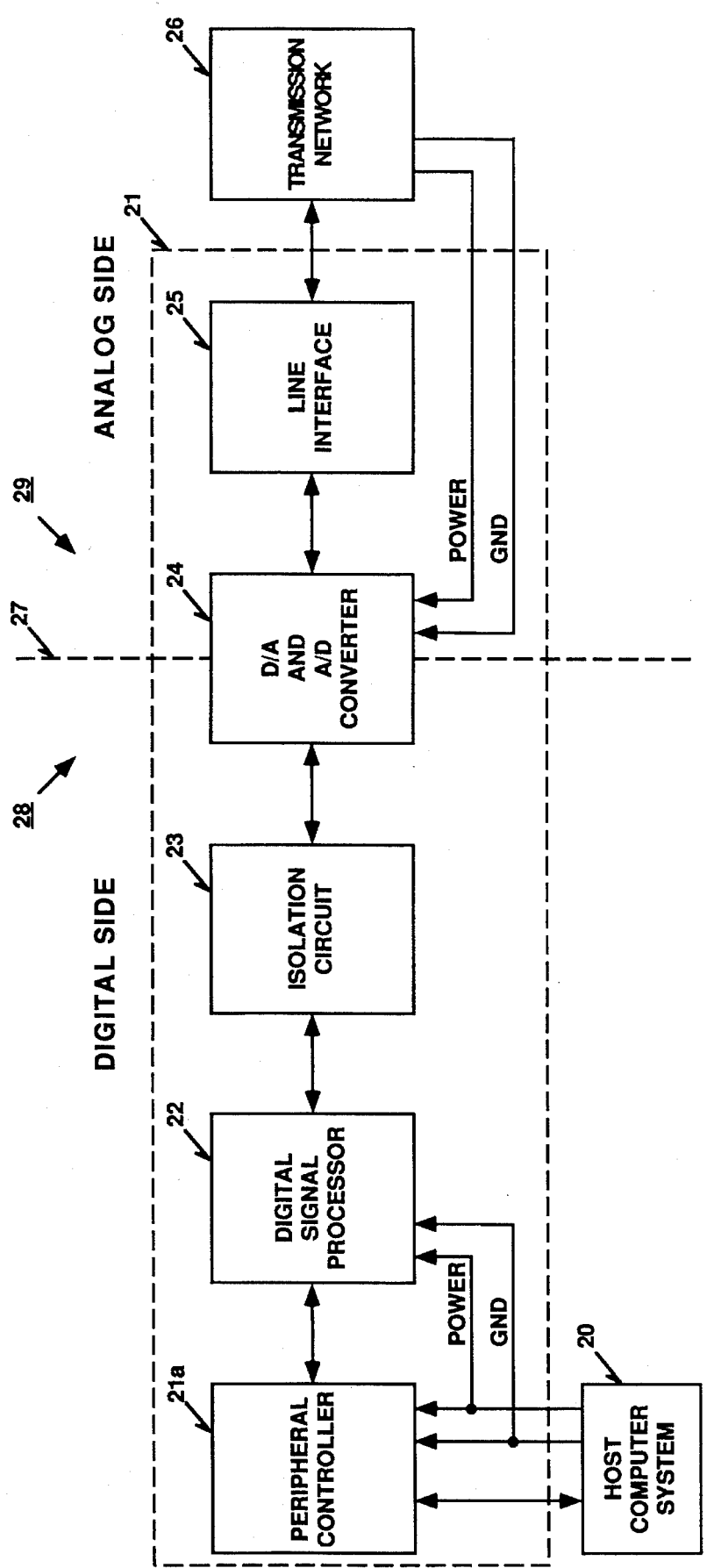
FIGS. 3A and 3B show alternative embodiments of the arrangement of FIG. 2.
Figure 3B:
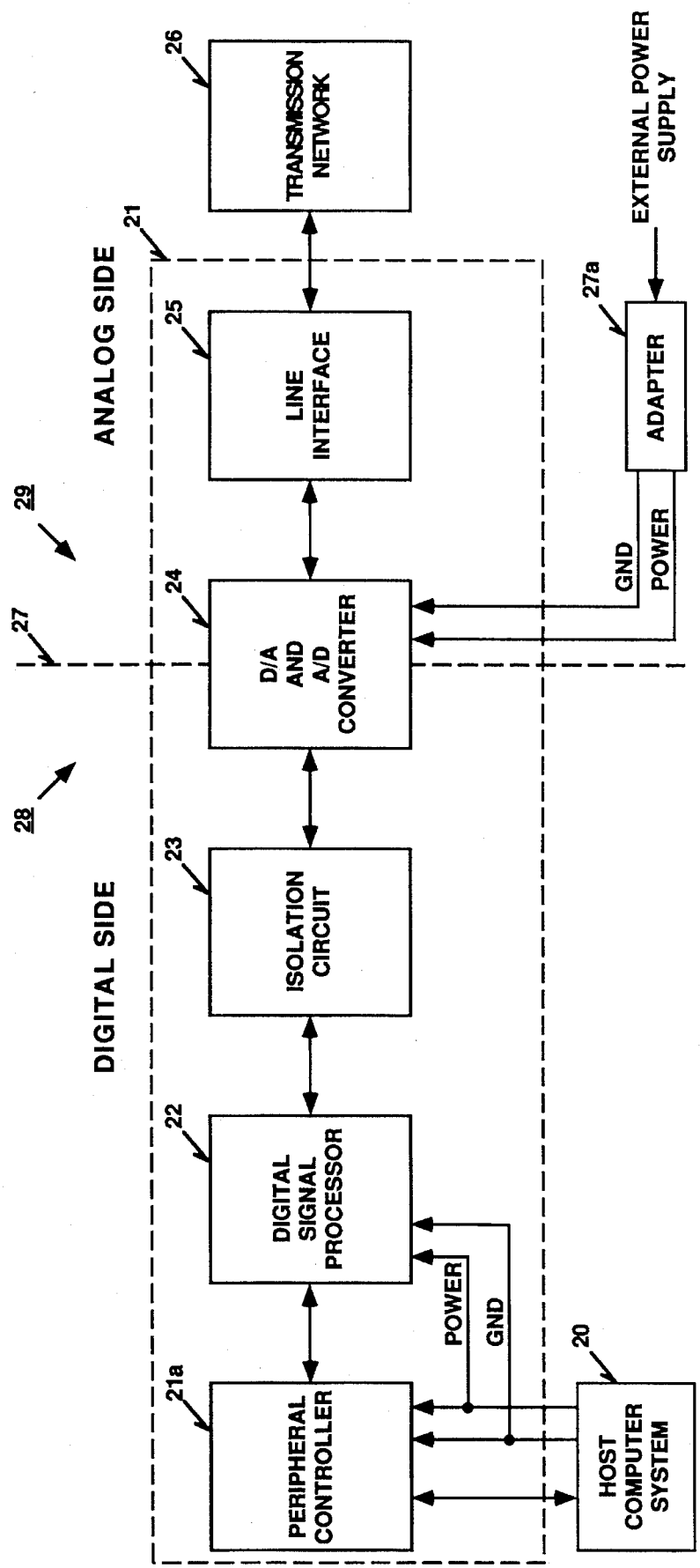

As can be seen from FIG. 3A, converter 24 is connected to receive the power supply POWER and ground signal GND from transmission network 26. This power extraction allows modem 21 to reduce its power consumption from its own power source or from computer system 20. Also, converter 24 may receive the power supply from an external adapter 27a with isolation instead of from network 26, as shown in FIG. 3B.

Alternatively, isolation circuit 23 can be embedded within either peripheral controller 21a or DSP 22 along a digital signal path.

Figure 4:
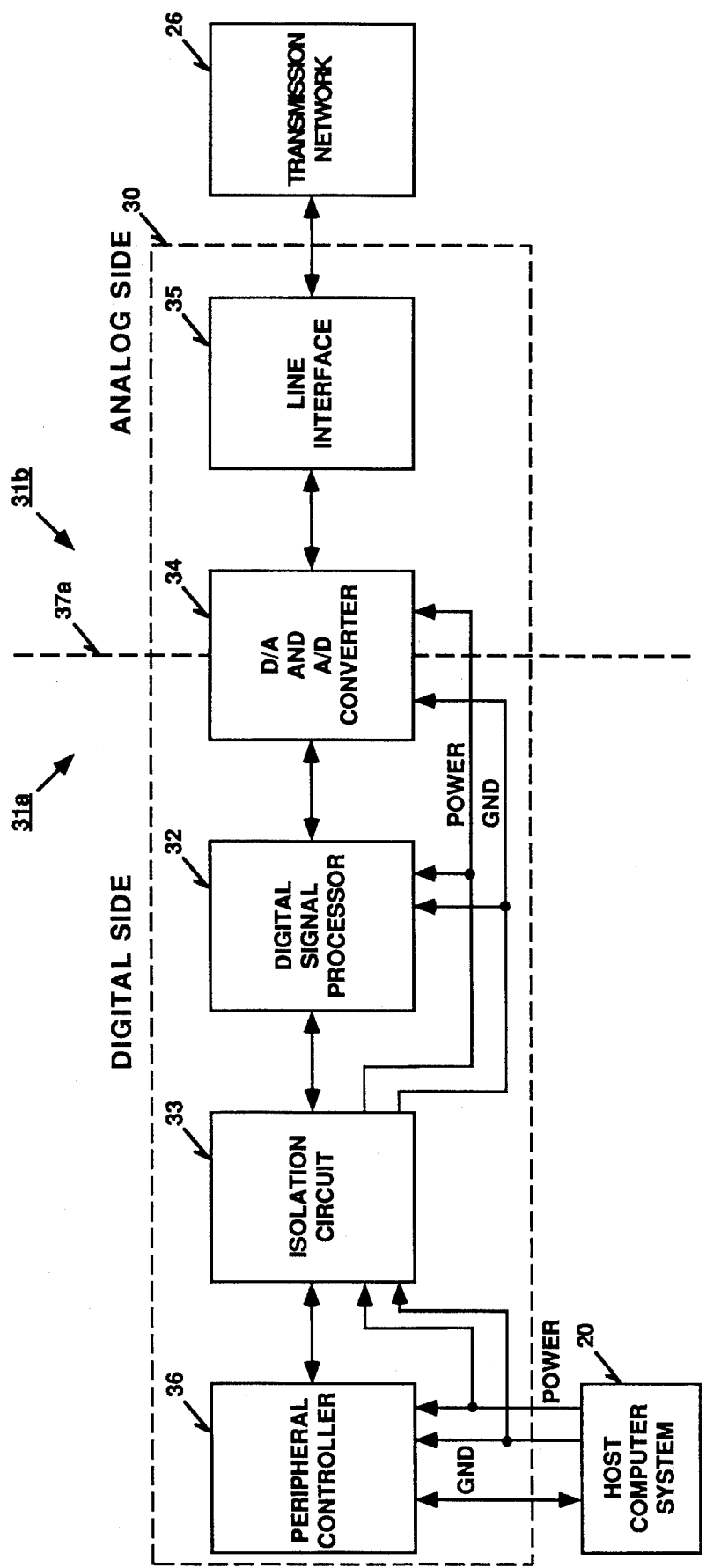
FIG. 4 shows another arrangement for isolating a computer system from a data transmission network in accordance with another embodiment of the present invention.

FIG. 4 shows modem 30 between host computer 20 and transmission network 26 that implements another embodiment of the present invention. Modem 30 includes a peripheral controller 36, a DSP 32, an isolation circuit 33, a converter 34, and a line interface circuit 35. These components 32–36 correspond to their respective components 21a–25 of modem 21 of FIGS. 2–3B and their functions and structures are therefore not described in detail below in order not to unnecessarily obscure the description of the invention.

As can be seen from FIG. 4, isolation circuit 33 is located along digital side 31a of modem 30. Isolation circuit 33 electrically isolates computer system 20 from transmission network 26. Moreover, because isolation circuit 33 is located along digital side 31a of modem 30, the noise and signal distortion produced by isolation circuit 33 do not affect the data transmission between computer system 20 and transmission network 26.

Figure 5A:
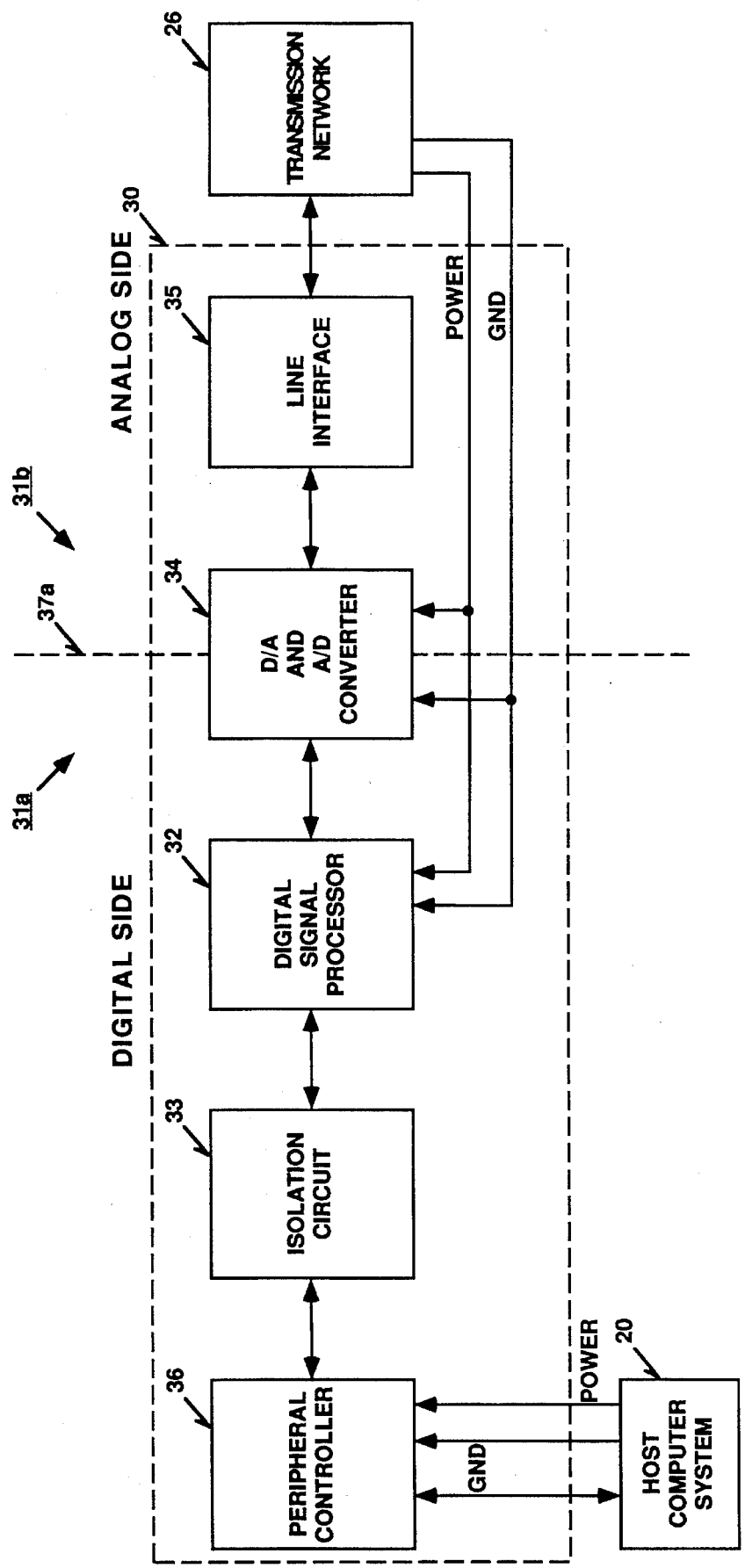
FIGS. 5A and 5B show alternative embodiments of the arrangement of FIG. 4.
Figure 5B:
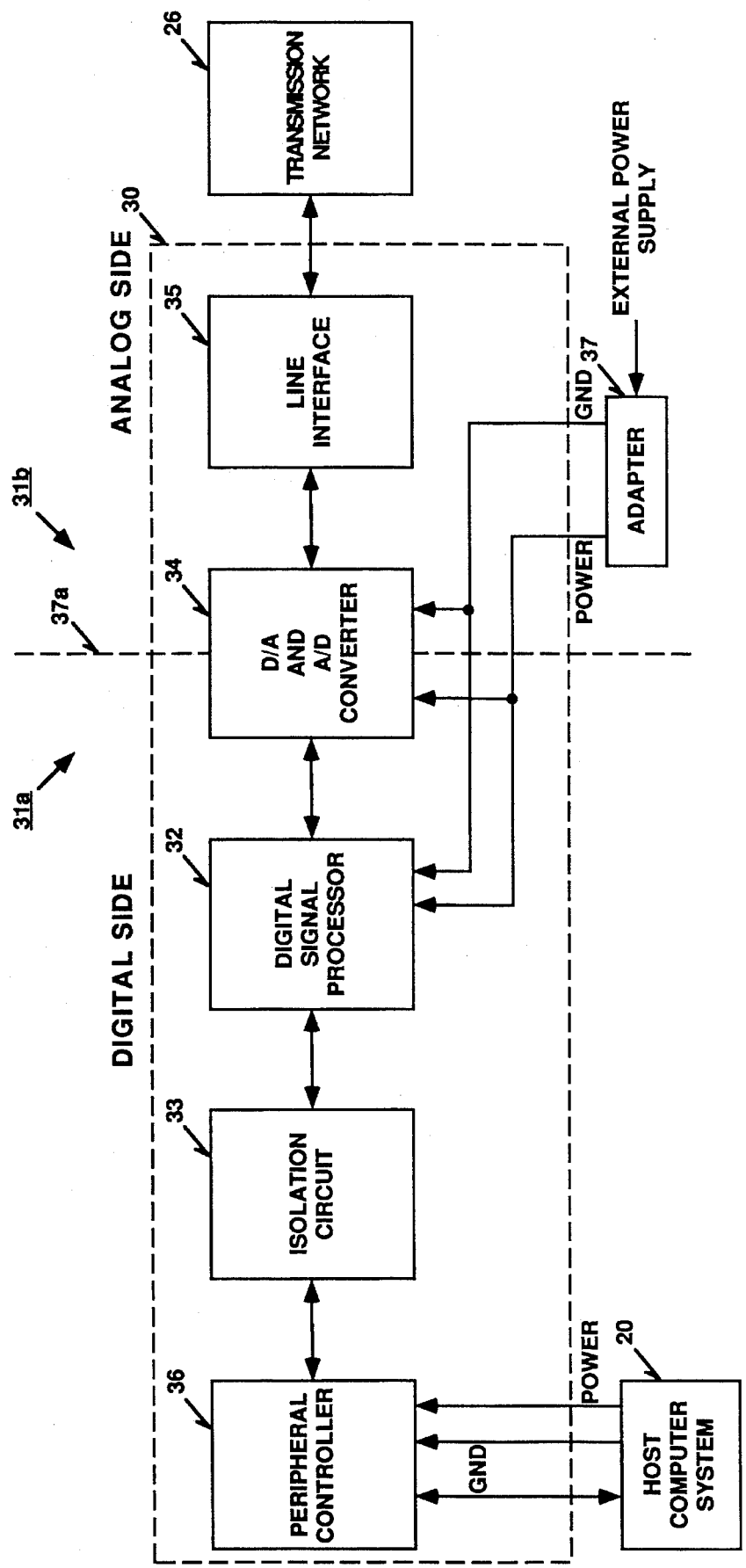

As can be seen from FIGS. 2 and 4, modem 30 of FIG. 4 is similar to modem 20 of FIG. 2, except that isolation circuit 33 of modem 30 is placed between DSP 32 and peripheral controller 36. This also electrically isolates DSP 32 from computer system 20 and peripheral controller 36, thus allowing DSP 32 to receive the power supply POWER and ground GND signal from transmission network 26 or an external power supply system. FIG. 5A shows that DSP 32 and converter 34 are powered by network 26. FIG. 5B shows that DSP 32 and converter 34 are powered via an external adapter 37 with isolation.

Alternatively, isolation circuit 33 can be located within DSP 32 or peripheral controller 36 along a digital signal path.

Figure 6:
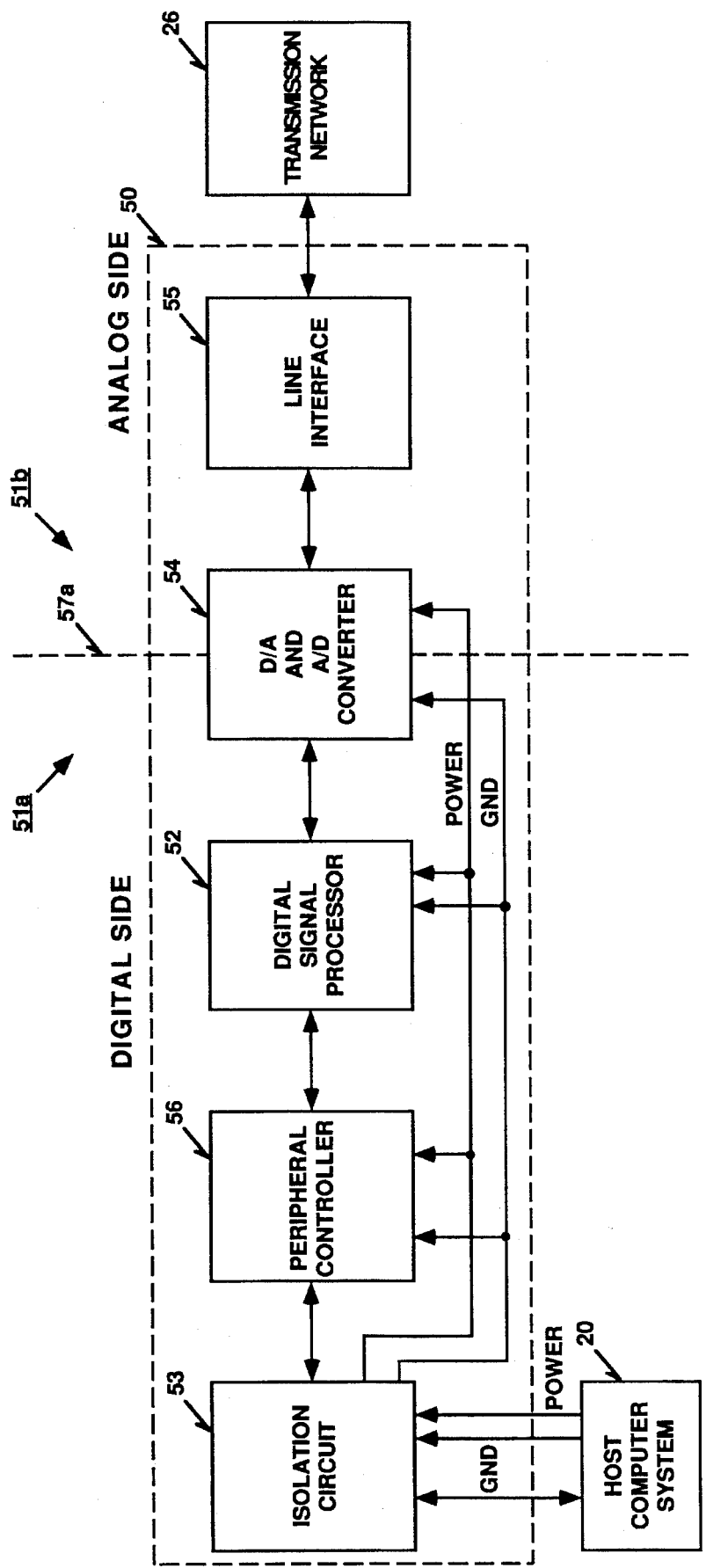
FIG. 6 shows yet another arrangement for isolating a computer system from a data transmission network in accordance with yet another embodiment of the present invention.
Figure 7A:
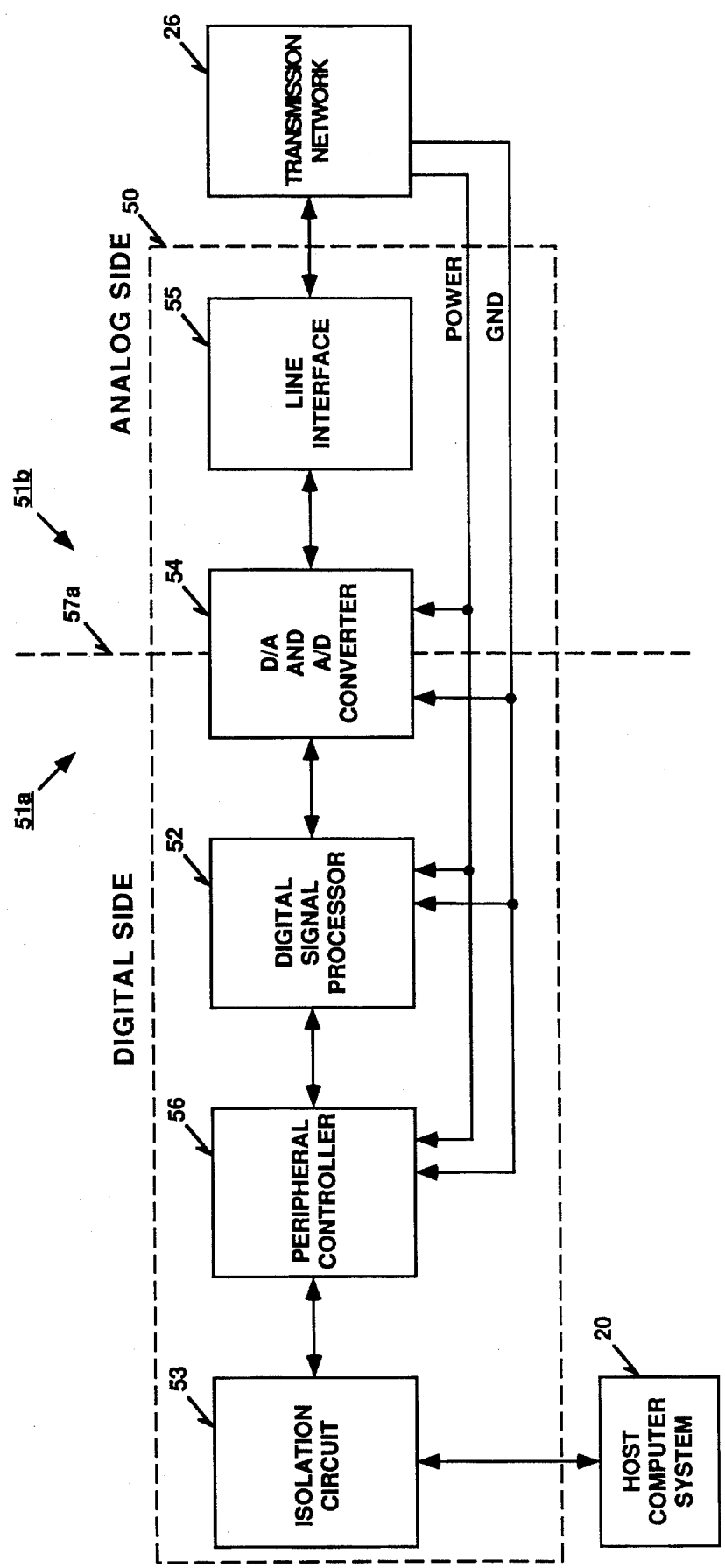
FIGS. 7A and 7B show alternative embodiments of the arrangement of FIG. 6.
Figure 7B:
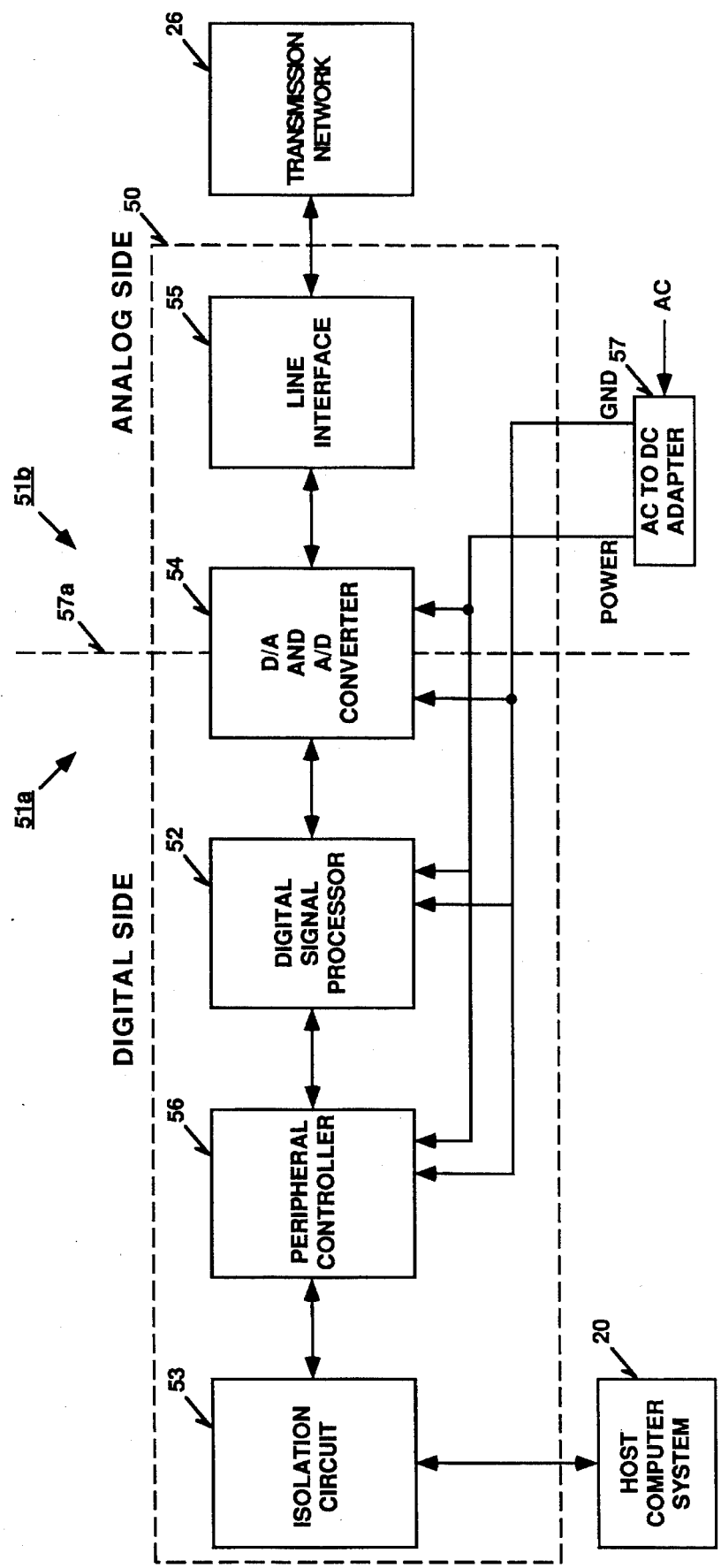

FIGS. 6, 7A, and 7B show modem 50 between host computer 20 and transmission network 26 that implement yet another embodiment of the present invention. As can be seen from FIGS. 4–7B, the difference between modem 50 of FIGS. 6–7B and modem 30 of FIGS. 4–5B is isolation circuit 53 of modem 50 (FIGS. 6–7B) is placed between peripheral controller 56 and host computer 20 while isolation circuit 33 of modem 30 (FIGS. 4–5B) is placed between peripheral controller 36 and DSP 32. As can be seen from FIGS. 6–7B, isolation circuit 53 also electrically isolates peripheral controller 56 from host computer 20. FIG. 7A shows that the entire modem 50 is powered by network 26. FIG. 7B shows that the entire modem 50 is powered via an external adapter 57 with isolation. This is because isolation circuit 53 electrically isolates the entire modem 50 from host computer 20.

Alternatively, isolation circuit 53 can be embedded within either DSP 52 or peripheral controller 56 along a digital signal path.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. In a data transmission system for a host computer and having a digital signal processor coupled to the host computer and a converter coupled to the digital signal processor and to an external data transmission network for converting signals from one form into another, and an isolation circuit for electrically isolating the host computer from the external data transmission network, the improvement comprising:

placing the isolation circuit between the host computer and the digital signal processor for electrically isolating the host computer from the data transmission network when data transmission is conducted between the host computer and the data transmission network such that (1) noise and signal distortion generated by the isolation circuit do not affect the data transmission between the host computer and the data transmission network and (2) the Converter and the digital signal processor are powered by a power supply of the data transmission network or an external Dower supply system.

2. The improvement of claim 1, wherein the external data transmission network is an analog data transmission network and the host computer is a digital computer system, wherein the isolation circuit digitally isolates the host computer from the data transmission network.

3. The improvement of claim 1, wherein the isolation circuit is placed between a peripheral controller coupled to the host computer and the digital signal processor.

4. The improvement of claim 1, wherein the isolation circuit further comprises an opto-coupler.

5. The improvement of claim 1, wherein the isolation circuit further comprises a transformer.

* * * * *

UNITED STATES PATENT AND TRADEMARK OFFICE
CERTIFICATE OF CORRECTION

PATENT NO.    : 5,473,552
DATED         : December 5, 1995
INVENTOR(S)   : Chen et al.

It is certified that error appears in the above-identified patent and that said Letters Patent is hereby corrected as shown below:

In column 6 at line 64 delete "Converter" and insert --converter--

In column 6 at line 66 delete "Dower" and insert --power--

Signed and Sealed this

Thirty-first Day of December, 1996

Attest:

BRUCE LEHMAN

Attesting Officer    Commissioner of Patents and Trademarks